United States Patent [19]

Vitringa et al.

[11] Patent Number: 4,685,094
[45] Date of Patent: Aug. 4, 1987

[54] LATERAL COMPLIANCE DEVICE FOR GEOPHONE SPRINGS

[75] Inventors: Frederick A. Vitringa, Quathiaski Cove, Canada; Arend L. Hagedoorn, Leiden, Netherlands

[73] Assignee: Geosource Inc., Houston, Tex.

[21] Appl. No.: 676,524

[22] Filed: Nov. 30, 1984

[51] Int. Cl.⁴ .......................... F16F 7/00; F16M 7/00; F16M 11/00; H04R 9/00
[52] U.S. Cl. ..................................... 367/183; 367/187; 188/380; 267/136; 267/141; 267/152; 267/181
[58] Field of Search ............... 367/182, 183, 184, 185, 367/186, 187; 267/158, 161, 181, 162, 163, 164, 165, 136, 141, 152; 73/649, 650, 651, 666; 188/380

[56] References Cited

U.S. PATENT DOCUMENTS

| | | | |
|---|---|---|---|
| 2,748,370 | 5/1956 | Baltosser | 367/187 |
| 2,947,529 | 8/1960 | Schwartz et al. | 267/161 |
| 3,170,736 | 2/1965 | Wright | 267/161 X |
| 3,344,397 | 9/1967 | Elliot et al. | 367/189 |
| 3,628,383 | 12/1971 | Tikanen et al. | 267/162 X |
| 3,742,441 | 6/1973 | Riley | 367/187 |
| 4,285,054 | 8/1981 | McNeel | 367/183 |
| 4,504,932 | 3/1985 | Sundt | 367/183 |
| 4,623,991 | 11/1986 | Vitringa | 367/183 |

Primary Examiner—Deborah L. Kyle
Assistant Examiner—Brian S. Steinberger
Attorney, Agent, or Firm—Arnold, White & Durkee

[57] ABSTRACT

A spring system for use with a geophone for suspending a reference mass axially and laterally. One spring of the spring system flexes more axially than laterally, and the other spring of the spring system flexes more laterally, although heavily damped, than axially.

13 Claims, 2 Drawing Figures

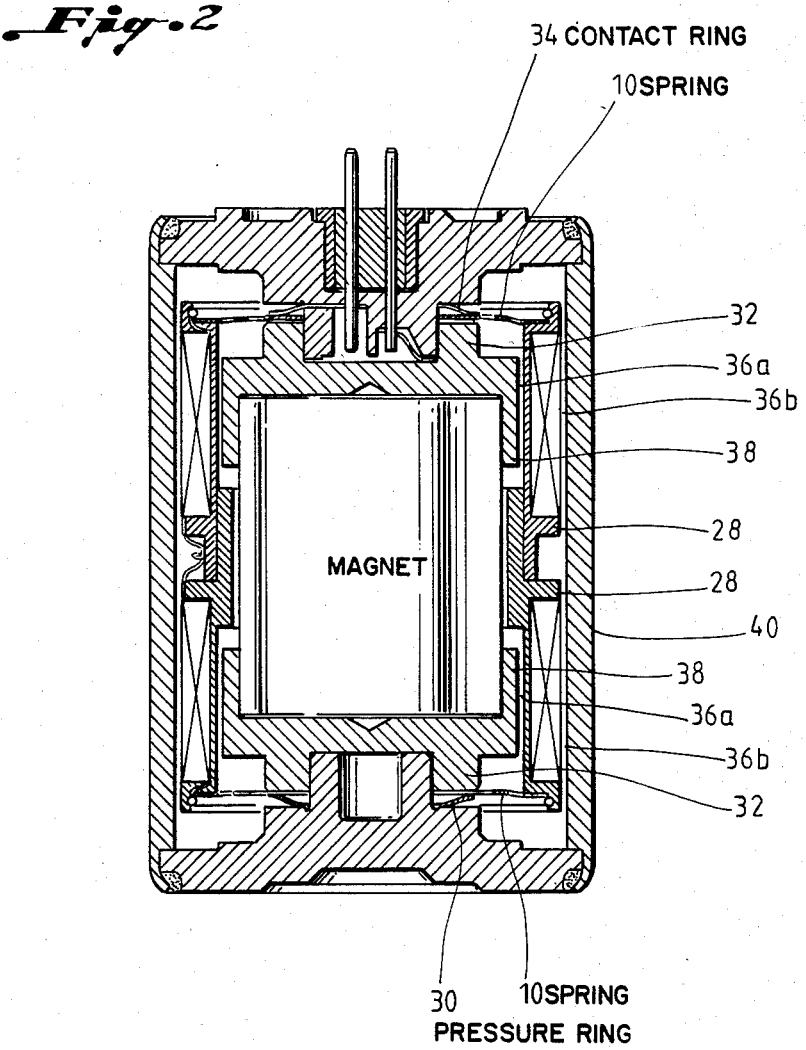

LATERAL COMPLIANCE DEVICE FOR GEOPHONE SPRINGS

BACKGROUND OF THE INVENTION

1. Field of the Invention

This invention relates generally to geophones, and more particularly to suspension springs for geophones or seismometers.

2. Description of the Related Art

Geophones are devices which sense motion by suspending an inertial reference mass structure from a rigid, fixed supporting structure. Typically, the mass is a coil form suspended by springs in a magnetic field, one spring being attached at each end of the coil form. The springs position the coil form within the magnetic field so that the coil form is centered laterally and along its axis within the magnetic field. The springs also form a suspension system having a predetermined resonant frequency.

In seismic operations, seismic waves are imparted into the earth's crust at or near the earth's surface, and portions of those seismic waves are reflected or refracted from the boundaries of subsurface layers. Geophones are arranged in arrays or groups on the earth's surface, and when the reflected or refracted waves encounter a geophone, the coil form, which is suspended between the two springs, tends to stand still while the geophone housing and its connected magnetic circuit moves with the earth's surface. The movement of the coil form through a magnetic field causes a voltage to be generated at the output of the geophone. The outputs of the arrays of geophones are recorded in a form which permits analysis. Skilled interpreters can discern from the analysis the shape of subsurface formations, and the likelihood of finding an accumulation of minerals, such as oil and gas.

In present day geophones, spider springs are used extensively. Such springs are usually made from discs of spring material and have an inner ring and an outer ring which are connected by a plurality of legs. The legs are formed by etching or stamping the spring material in accordance with a predetermined pattern. Generally three such legs are used, and the three-legged arrangement is generally considered the most advantageous.

The legs of geophone springs generally have a rectangular cross-section and are curved along their lengths between the junctures with the inner and outer rings of the spring. After etching, the spring is "preformed" according to known techniques. When preforming is complete, the inner ring is offset or displaced relative to the outer ring, such that when a mass is suspended between two such springs, the inner ring, legs, and outer ring of each spring lie in the same plane.

A geophone is intended to sense motion from a direction which is roughly parallel to the axis of movement of the coil form with respect to the geophone housing. Therefore, it is desirable to eliminate or minimize the effects of any lateral motion of the coil form in response to forces which are not parallel to the axis of movement of the suspended coil form within the geophone.

In seismic operations, an impulse which is not truly parallel with the geophone axis and which contains a frequency component at or very near to that of the spurious frequency causes the geophone to produce an undesired or false EMF in the coils. Because of its high Q, the movement will continue for some time after the force which caused it has subsided. This resonance is considered to be the main spurious frequency in a geophone and it is highly undesirable as it limits the geophone's upper clean bandwidth.

Inasmuch as the geometry and the mass of the coil form for a given model of geophone are constant within manufacturing limits, the spurious resonance is also constant. The frequency of the spurious resonance can therefore be raised or lowered by changing the geometry of the suspension springs. This characteristic has been used to raise the frequency of these false signals until they are beyond the desirable frequency spectrum of the geophone by increasing the lateral stiffness of the spring. With this approach, these false signals do not interfere with or corrupt signals of interest. A common method of increasing the lateral stiffness of the spring is to shorten the spring legs. Unfortunately, the signal distortion caused by spring nonlinearity is increased when the legs are relatively short, and spring life is reduced.

It has been recently discovered that for a spring having a natural frequency of 10 hertz or less, a ratio of about 50 to 1 of the spurious resonant frequency to the natural frequency of the geophone can be achieved by straightening the legs as much as possible. Such springs exhibit a clean bandwidth at frequencies higher than previously thought possible. However, the useful life of such springs is shorter than other springs which exhibit less lateral stiffness and more lateral elasticity, because the stiffness of the legs does not allow the coil form to hit its normal intended stops for violent lateral movements. Accordingly, the art has sought to extend the useful life of laterally stiff geophone springs.

The art has sought an effective, simple device to give lateral elasticity to the two types of laterally stiff geophone springs: those having a high natural frequency, and those having a high ratio of the spurious resonant frequency to the natural frequency. Such lateral elasticity has been deemed desirable in order to withstand rapid acceleration or deceleration as encountered in hard usage or destruction tests of a geophone.

SUMMARY OF THE INVENTION

In accordance with the present invention, a geophone spring is provided having both durability and a high spurious resonant frequency. According to the present invention, those desirable results are realized as follows: a spring is etched or stamped in the disc-shaped material, and a lateral compliance device, also being a spring, is also etched or stamped in the spring material. Thus, a spring system for a geophone is provided which comprises two suspension parts or means for different purposes for suspending a reference mass. The first suspension means suspends the reference mass along the vertical axis of the geophone and also centers the reference mass both laterally, or radially, and along the axis. The second suspension means also centers the reference mass both laterally, and along the axis but in addition provides a heavily damped compliance in a lateral, or radial, direction to the movement of the reference mass. This prevents the spring of the first part from being stretched beyond its elastic limits. In comparison, the first suspension means is more flexible axially than laterally, while the second suspension means is more flexible laterally than axially.

In one embodiment, a geophone spring comprises outer, middle, and inner ring members. The outer spring is formed between the outer and middle ring members.

A plurality, e.g., three, leg members connect the outer ring member and the middle ring member. The inner spring is formed between the middle and inner ring members. The inner spring in this embodiment is formed by making two concentric, circular etchings or stampings close to the innermost edge of the inner ring member. Each such etching or stamping in the spring material has three short breaks, so that each etched ring is divided into three equal arcs. The inner spring is formed relatively close to the center of the disc, and, in operation, acts as a compliance device for lateral forces, allowing the coil form or reference mass to move within the geophone until it hits its intended stops, without forcing the springs beyond their elastic limits.

In another embodiment the suspended reference mass is the total magnetic circuit, and the coils are rigidly fixed to the outer case. In still another embodiment, the lateral compliance device may, provided it can be heavily damped, be near the outer perimiter of the spring disc.

The configuration of the inner spring may be varied. Three or four sets of such concentric etchings may be made. According to other embodiments of the invention, the etchings or stampings forming the inner spring may be of any shape providing they produce the desired lateral compliance and are in a place where they can be heavily damped. In a preferred embodiment, the inner spring is not preformed, i.e., it remains flat.

The inner spring does not have to be etched into an existing spring. In an alternate embodiment, the inner spring can be a separate flat disc inserted in the center hole of and in the plane of the inner ring of an existing spring. Alternatively, the lateral compliance device could be on top of or underneath the existing spring, connected to the inner ring of the existing spring.

In another embodiment, the flat disc comprising the lateral compliance device can be made of plastic.

A geophone spring in accordance with the present invention, when compared with previously used springs, has the advantage of maintaining substantially linear performance even after having been subjected to the abnormally strong lateral forces experienced in rough handling or destruction tests. Furthermore, unexpected results of recent tests have shown that the invention when properly applied greatly reduces the amplitude of spurious resonance.

BRIEF DESCRIPTION OF THE DRAWINGS

In the accompanying drawings:

FIG. 2 is a cross-sectional view of a geophone.

DESCRIPTION OF A SPECIFIC EMBODIMENT

Figure 1:
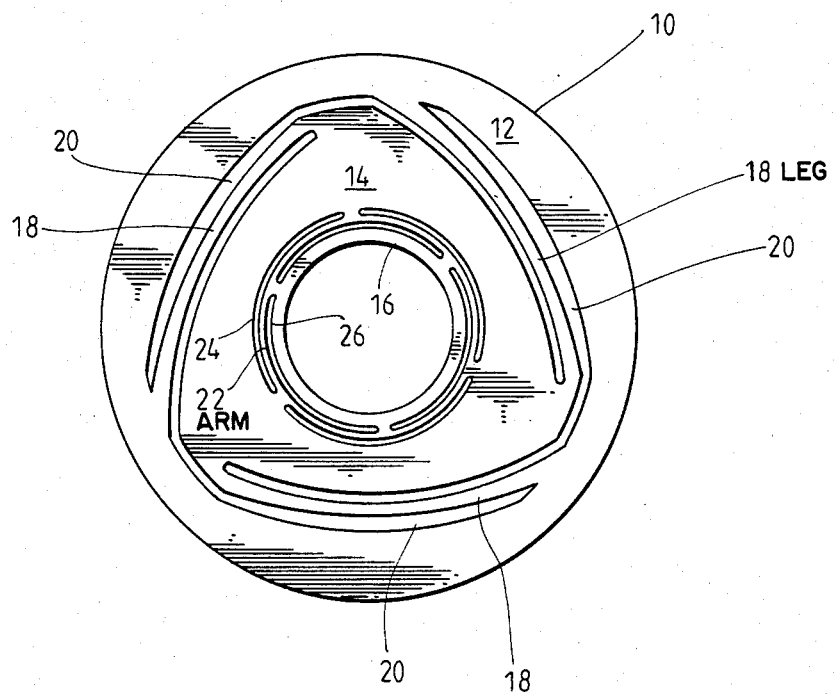
FIG. 1 is a planar view of one embodiment of a geophone spring in accordance with the present invention.

Referring to FIG. 1, there is illustrated a geophone spring 10 in accordance with the present invention. The geophone spring 10 is made from a thin, disc-shaped material such as beryllium copper.

The geophone spring 10 comprises an outer spring which in turn has an outer ring member 12, a middle ring member 14, and an inner ring member 16. The outer ring member 12 and the middle ring member 14 are connected by a plurality of legs 18, which are formed by removing those portions of the disc designated 20. Preferably, this removal is effected by known etching techniques. The combination of the outer ring member 12, the middle ring member 14, and the legs 18 constitutes a first suspension means.

Still referring to FIG. 1, the geophone spring 10 includes an inner spring which is formed between the middle ring member 14 and the inner ring member 16. The middle ring member 14 and the inner ring member 16 are connected by arms 22. The combination of the middle ring member 14, the inner ring member 16, and the arms 22 constitutes a second suspension means. The arms 22 are formed by removing those concentric portions of the disc designated 24, 26, and that removal can be done by etching or stamping. The inner spring can be stamped or etched in any geophone spring, and is shown incorporated into a delta-shaped geophone spring 10.

As noted above, the configuration and number of the etchings to form the inner spring may be varied as desired or required.

In a preferred embodiment, although the outer spring of the geophone spring 10 may be flat or preformed, the inner spring is not preformed, but remains flat. The six arms 22 are preferably substantially equal in length, and are as long as possible. The width of the arms 22 can be increased to give greater stiffness to the lateral compliance action of the inner spring, or a concentric set of arms can be added to decrease the lateral stiffness.

Referring to FIG. 2, a geophone has two geophone springs 10, one on the top and one on the bottom of the coil form 28. When installed in a geophone, the outer spring of each spring 10 supports approximately one-half the weight of the coil form 28 and each spring 10 is substantially flat when the coil form 28 is in the rest position. As the outer spring of the spring 10 supports the coil form 28, for axial movement it also centers the coil form 28 along the vertical axis of the geophone.

When the geophone spring 10 is installed on the bottom of the coil form, a pressure ring means, herein called a pressure ring 30 pushes the middle ring member 14 against the flat surface of a pole piece member, herein called a pole piece shoulder 32. The frictional effect of the flat surface of the middle ring member 14 being held against the flat surface of the pole piece shoulder 32 dampens any lateral resonances that could be produced during normal operation. That is, the combination of the pressure ring 30 and the pole piece shoulder 32 constitutes a means for damping the lateral movement of the inner spring.

When a second geophone spring 10 is installed on the top of the coil form, a contact ring 34 pushes the middle ring member 14 against the flat surface of a pole piece shoulder 32. The same frictional effect described above also operates with the second spring 10 on the top of the coil form. That is, the combination of the contact ring 34 and the pole piece shoulder 32 constitutes a means for damping the lateral movement of the inner spring.

During rough handling or destruction tests, the arms 22 will flex to allow the coil form 28 to hit its lateral stops. The coil form 28 has a gap 36 on either side. To the left of the gap 36a is a pole piece 38. To the right of the gap 36b is a geophone case 40. Both the inner spring and the outer spring of the spring 10 center the coil form 28 laterally between the pole piece 38 and the case 40. The pole piece 38 and the geophone case 40 are the lateral stops which stop the lateral motion of the coil form 28.

The legs 18 are too stiff by themselves to allow sufficient lateral movement and, therefore, they absorb the shock to their detriment if the lateral compliance device is not added. Since the arms 22 flex to allow the coil form 28 to hit both the pole piece 38 and the case 40, the legs 18 do not have to absorb the shocks. This extends the useful life of the legs 18, and thus of the spring 10.

The foregoing description of the invention has been directed in primary part to a particular preferred embodiment in accordance with the requirements of the patent statute and for purposes of explanation and illustration. It will be apparent, however, to those skilled in this art that many modifications and changes in this specific device may be made without departing from the scope and spirit of the invention. For example, the rings 20, 22 could be in the shapes of triangles, squares, or even irregular polygons. Alternatively, the inner spring could be in a plane above or below the existing spring.

It is applicants' intention in the following claims to cover such modifications and variations as fall within the true spirit and scope of the invention.

What is claimed is:

1. In a geophone having a pole piece member and having a reference mass suspended for movement along a vertical axis, and a spring system for suspending the reference mass, the spring system having a stiff spring constant for movement lateral to the vertical axis such that the ratio of spurious resonant frequency to the natural frequency of the spring system is at least 20 to 1, the spring system comprising:
   (a) first suspension means for suspending the reference mass along the vertical axis and for centering the reference mass both laterally and along the axis, and
   (b) second suspension means for centering the reference mass both laterally and along the axis, and for providing a heavily damped compliance in a lateral direction to the movement of the reference mass, comprising a pressure ring means for pushing the first suspension means against the pole piece member, whereby lateral movement is permitted for the spring system under shock loads to reduce breakage and damage to said first suspension means.

2. A spring system for use in a geophone having a pole piece member, the spring system having a stiff spring constant for lateral movement, such that the ratio of spurious resonant frequency to the natural frequency of the spring system is at least 20 to 1, the spring system further comprising:
   (a) an outer spring;
   (b) an inner flat spring connected to the outer spring; and
   (c) pressure ring means for pushing the inner flat spring against the pole piece member for damping lateral movement of the inner spring, whereby lateral movement of the inner spring is permitted during rough handling of the geophone, thus reducing breakage and damage to said outer spring.

3. The geophone spring of claim 2 wherein the inner spring comprises arms of substantially equal length.

4. The geophone spring of claim 2 wherein the inner spring comprises six arms of substantially equal length.

5. A geophone having a pole piece member and having a spring system, the spring system having a stiff spring constant for lateral movement such that the ratio of spurious resonant frequency to the natural frequency of the spring is at least 20 to 1, the spring system further comprising:
   (a) an outer ring member, a middle ring member and an inner ring member;
   (b) a plurality of legs which connect the outer and middle ring members;
   (c) an inner spring which connects the middle and inner ring members; and
   (d) pressure ring means for pushing the middle ring member against the pole piece member for damping the lateral movement of the inner spring whereby lateral movement occurs only during shocks to the geophone, thus allowing the frequency of spurious resonances to remain high, while at the same time allowing sufficient lateral movement during shocks to the geophone to prevent damage to said legs.

6. The geophone of claim 5 wherein the inner spring is flat.

7. The geophone of claim 6 wherein the legs are formed from a thin flat disc and then preformed.

8. The geophone of claim 5 wherein the inner spring comprises arms of substantially equal length.

9. The geophone of claim 8 wherein the arms comprise six arms.

10. The geophone of claim 9 wherein the inner spring is flat and said legs are preformed.

11. A spring system for suspending a mass along a vertical axis within a geophone having a pole piece member, the spring system having a stiff spring constant for lateral movement such that the ratio of spurious resonant frequency to the natural frequency of the spring system is at least 20 to 1, the spring system further comprising:
   (a) a first suspension means for centering the mass both laterally and along the axis wherein the first suspension means is more flexible axially than laterally; and
   (b) a second suspension means for centering the mass both laterally and along the axis, comprising a pressure ring means for pushing the first suspension means against the pole piece member, wherein the second suspension means is more flexible laterally than axially so that lateral movement of the spring system occurs during shocks to the geophone to reduce breakage and damage to said first suspension means.

12. The spring system of claim 11 wherein the first and second means are in the same plane perpendicular to the axis.

13. A geophone having a pole piece member and having a spring system, the spring system having a stiff spring constant for lateral movement, such that the ratio of spurious resonant frequency to the natural frequency of the spring is at least 20 to 1, the spring system further comprising:
   (a) an outer spring;
   (b) an inner flat spring connected to the outer spring; and
   (c) pressure ring means for pushing the inner spring against the pole piece member whereby lateral movement of the inner spring is damped, whereby lateral movement occurs during shocks to the geophone to reduce breakage and damage to the spring system.

* * * * *